US006729644B2

(12) United States Patent
Hill

(10) Patent No.: US 6,729,644 B2
(45) Date of Patent: May 4, 2004

(54) INFLATABLE CURTAIN WITH REDUCED MATERIAL CONSTRUCTION

(75) Inventor: Bruce R. Hill, Bloomfield Hills, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/949,056

(22) Filed: Sep. 7, 2001

(65) Prior Publication Data

US 2003/0047918 A1 Mar. 13, 2003

(51) Int. Cl.[7] .............................................. B60R 21/22
(52) U.S. Cl. ................................ 280/730.2; 442/203
(58) Field of Search .......................... 280/743.1, 730; 139/383, 85, 383 R, 384 R, 387 R, 389; 442/65–68, 76, 148, 149, 164, 168, 169, 170, 203, 284

(56) References Cited

U.S. PATENT DOCUMENTS

| 592,057 | A | * | 10/1897 | Knight | 139/389 |
|---|---|---|---|---|---|
| 3,991,249 | A | * | 11/1976 | Yamashita et al. | 428/35.5 |
| 4,025,684 | A | * | 5/1977 | Neidhardt | 442/206 |
| 5,011,183 | A | | 4/1991 | Thoraton et al. | |
| 5,098,125 | A | | 3/1992 | Thoraton et al. | |
| 5,131,434 | A | * | 7/1992 | Krummheuer et al. | 139/35 |
| 5,277,230 | A | * | 1/1994 | Sollars, Jr. | 139/389 |
| 5,503,197 | A | * | 4/1996 | Bower et al. | 139/435.1 |
| 5,685,347 | A | * | 11/1997 | Graham et al. | 139/390 |
| 5,788,270 | A | | 8/1998 | Haland et al. | |
| 5,865,462 | A | | 2/1999 | Robins et al. | |
| 5,865,464 | A | | 2/1999 | Kanuma et al. | |
| 6,328,334 | B1 | * | 12/2001 | Kanuma | 280/730.2 |
| 6,398,253 | B1 | * | 6/2002 | Heigl | 280/729 |
| 6,431,589 | B1 | * | 8/2002 | Heigl et al. | 280/730.2 |

* cited by examiner

Primary Examiner—Lesley D. Morris
Assistant Examiner—Paul Royal, Jr.
(74) Attorney, Agent, or Firm—Tarolli, Sundheim, Covell & Tummino L.L.P.

(57) ABSTRACT

Apparatus (10) for helping to protect an occupant of a vehicle (12) includes an inflatable vehicle occupant protection device (14) that is inflatable into a position between a part of the vehicle and a vehicle occupant. The inflatable device (14) includes overlying panels (40 and 42) that are secured together. An inflation fluid source (24) provides inflation fluid for inflating the inflatable device. The panels (40 and 42) include first overlying portions (100) subject to relatively low stress that extend across the inflatable device (14) when inflated. The panels (40 and 42) further include second overlying portions (102) subject to relatively high stress that extend across the inflatable device (14) when inflated. The first portions (100) have a woven construction of a first weave density. The second portions (102) have a woven construction of a second weave density, greater than the first weave density.

14 Claims, 4 Drawing Sheets

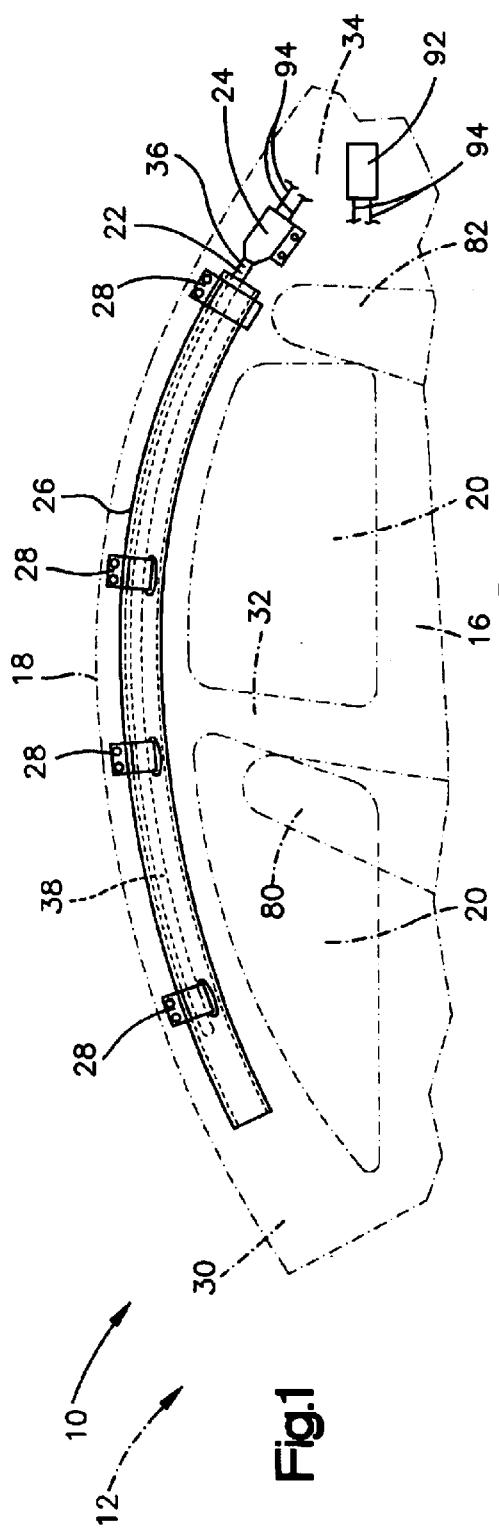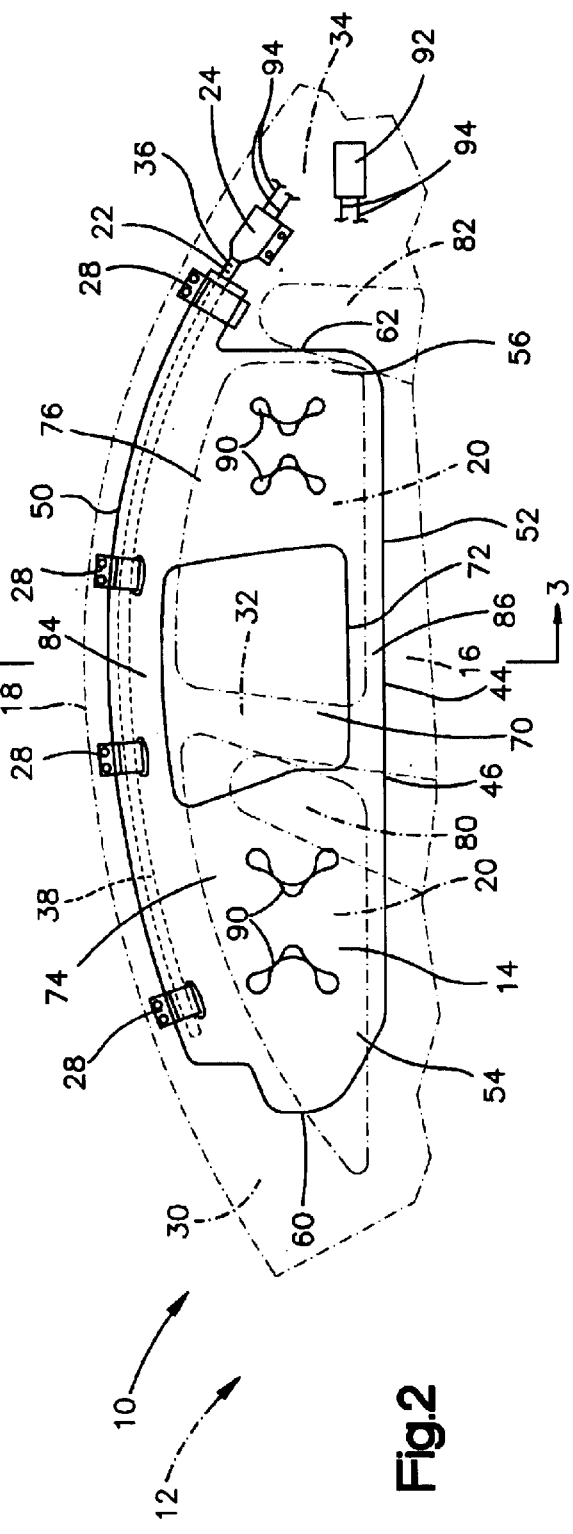

US 6,729,644 B2

INFLATABLE CURTAIN WITH REDUCED MATERIAL CONSTRUCTION

FIELD OF THE INVENTION

The present invention relates to an inflatable apparatus for helping to protect a vehicle occupant in the event of a side impact to the vehicle and/or a vehicle rollover. In particular, the present invention relates to an inflatable curtain having a woven design that reduces amount of required construction materials.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that inflates away from the roof of the vehicle downward inside the passenger compartment between a vehicle occupant and the side structure of the vehicle in the event of a side impact or rollover. A known inflatable curtain is inflated from a deflated condition by inflation fluid directed from an inflator to the inflatable curtain.

SUMMARY OF THE INVENTION

The present invention relates to an apparatus for helping to protect an occupant of a vehicle. The apparatus includes an inflatable vehicle occupant protection device that is inflatable into a position between a part of the vehicle and a vehicle occupant. An inflation fluid source provides inflation fluid for inflating the inflatable vehicle occupant protection device.

The inflatable vehicle occupant protection device includes overlying panels that are secured together. The panels include first overlying portions subject to relatively low stress that extend across the inflatable vehicle occupant protection device when inflated. The panels further include second overlying portions subject to relatively high stress that extend across the inflatable vehicle occupant protection device when inflated. The first portions have a woven construction of a first weave density. The second portions have a woven construction of a second weave density, greater than the first weave density.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 1 is a schematic view of an apparatus for helping to protect a vehicle occupant illustrating the apparatus in a deflated condition, according to the present invention;

FIG. 2 is a schematic view of the apparatus of FIG. 1 in an inflated condition;

DESCRIPTION OF A PREFERRED EMBODIMENT

Figure 3:
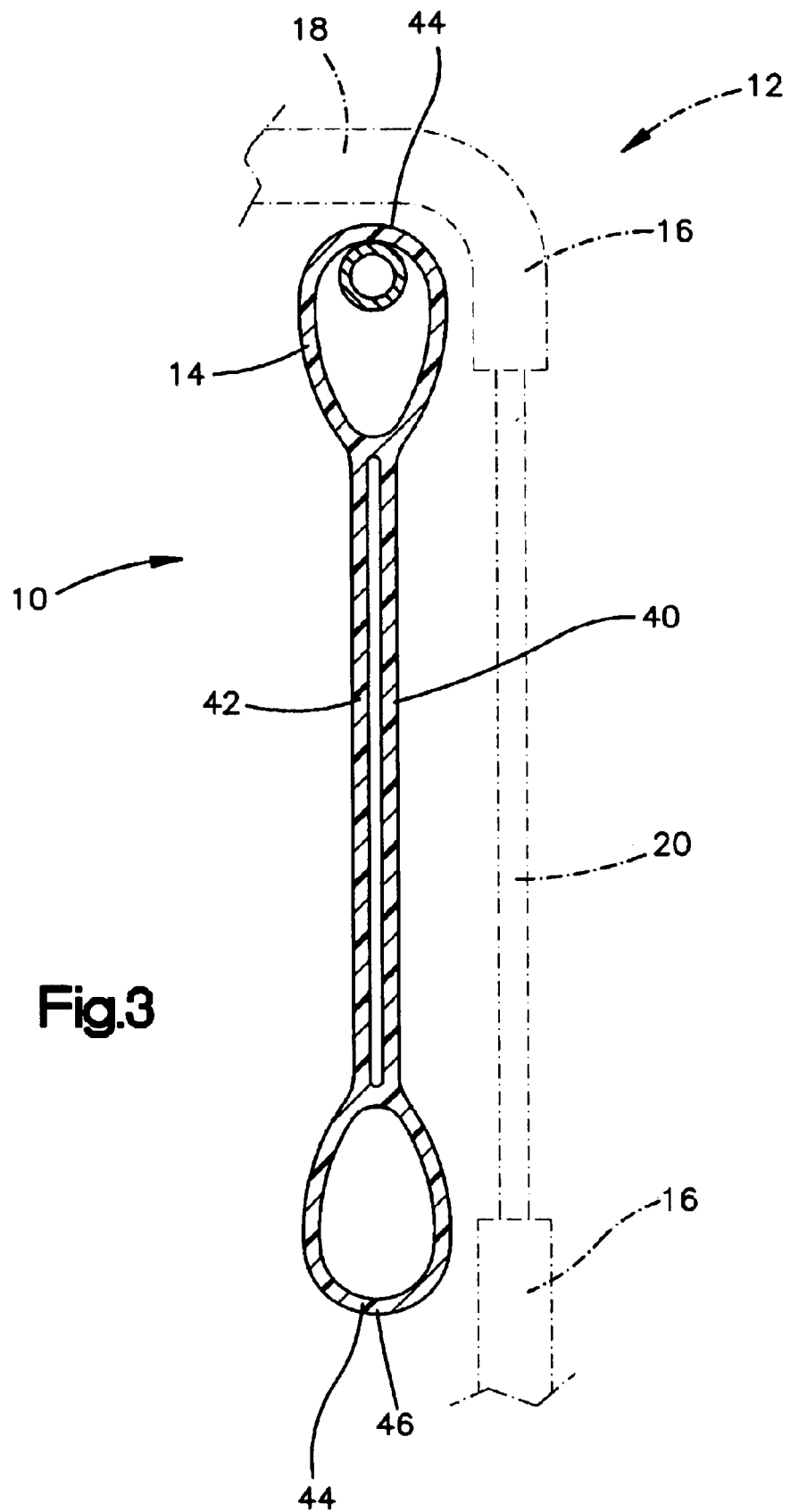
FIG. 3 is a sectional view of the apparatus taken generally along line 3—3 in FIG. 2.

Representative of the present invention, an apparatus 10 helps to protect an occupant of a vehicle 12. As shown in FIGS. 1 and 2, the apparatus 10 includes an inflatable vehicle occupant protection device in the form of an inflatable curtain 14 that is mounted adjacent the side structure 16 of the vehicle 12 and the roof 18 of the vehicle. The side structure 16 of the vehicle 12 includes side windows 20, an A pillar 30, a B pillar 32, and a C pillar 34. An inflator 24 is connected in fluid communication with the inflatable curtain 14 through a fill tube 22. The fill tube 22 may be constructed of any suitable material, such as metal, plastic, or fabric. Also, those skilled in the art will recognize that the fill tube 22 may be omitted, in which case the inflator 24 may be connected directly to the inflatable curtain 14.

The fill tube 22 has a first end portion 36 for receiving fluid from the inflator 24. The fill tube 22 may be connected directly to the inflator 24 or a manifold (not shown) may connect the fill tube to the inflator. The fill tube 22 has a second end portion 38 disposed in the inflatable curtain 14.

The inflator 24 contains a stored quantity of pressurized inflation fluid (not shown) in the form of a gas to inflate the inflatable curtain 14. The inflator 24 alternatively could contain a combination of pressurized inflation fluid and ignitable material for heating the inflation fluid, or could be a pyrotechnic inflator that uses the combustion of gas-generating material to generate inflation fluid. As a further alternative, the inflator 24 could be of any suitable type or construction for supplying a medium for inflating the inflatable curtain 14.

The apparatus 10 includes a housing 26 (FIG. 1) that stores the inflatable curtain 14 in a stored and deflated condition. The fill tube 22, the deflated inflatable curtain 14, and the housing 26 have an elongated configuration and extend along the vehicle roof 18 and along the side structure 16 of the vehicle 12 above the side windows 20. The fill tube 22, inflatable curtain 14 and housing 26 are connected to the vehicle 12 by known means 28, such as brackets.

As best illustrated in FIG. 3, the inflatable curtain 14 comprises first and second panels 40 and 42 that are arranged in an overlying manner. Overlapping portions of the first and second panels 40 and 42 are secured together by weaving the panels together along at least a portion of a perimeter 44 (FIGS. 2 and 3) of the inflatable curtain 14 to form a perimeter connection 46 of the curtain. The perimeter connection 46 helps define an inflatable volume of the inflatable curtain 14.

The first and second panels 40 and 42 are woven from a material such as nylon yarn. The first and second panels 40 and 42 may be coated with a gas impermeable material, such as urethane, or laminated with a gas impermeable film. The inflatable curtain 14 thus may have a substantially gas-tight construction. Those skilled in the art will appreciate that alternative materials, such as polyester yarn, and alternatives coatings, such as silicone, may also be used to construct the inflatable curtain 14.

The perimeter 44 is defined at least partially by an upper edge 50 (FIG. 2) of the inflatable curtain 14, an opposite lower edge 52 of the curtain, and front and rear portions 54 and 56, respectively, of the curtain spaced apart horizontally along the upper and lower edges. In the embodiment illustrated in FIG. 2, the front and rear portions 54 and 56 of the inflatable curtain 14 are partially defined by front and rear edges 60 and 62, respectively, that are spaced horizontally apart along the upper and lower edges 50 and 52 and extend between the upper and lower edges. Those skilled in the art, however, will appreciate that the inflatable curtain 14 may have a shape that differs from that of the curtain of the illustrated embodiment. For example, in the illustrated embodiment, the rear edge 62 could be omitted and the upper and lower edges 50 and 52 could be curved and extended until they intersect, in which case the rear portion 56 would be defined by the intersecting upper and lower edges.

The inflatable curtain 14 includes a non-inflatable portion 70. The non-inflatable portion 70 is defined by a perimeter 72 (FIGS. 2 and 3) wherein the first and second panels 40 and 42 are interconnected. As illustrated in FIG. 2, the non-inflatable portion 70 may extend over a substantial portion of the total surface area of the inflatable curtain 14, such as at least 10–15% of the entire surface area of the curtain.

Those skilled in the art will recognize that the first and second panels 40 and 42 could be interconnected across the entire non-inflatable portion 70, or any desired portion thereof. For example, the non-inflatable portion 70 could comprise a plurality of individual non-inflatable portions (not shown) that are spaced apart from each other. In this instance, the non-inflatable portion 70 may comprise a plurality of elongated parallel connections that interconnect the first and second panels, defining a plurality of inflatable parallel chambers between the connections.

As illustrated in FIG. 2, when the inflatable curtain 14 is inflated, the non-inflatable portion 70 is positioned generally rearward of a front vehicle seat 80 and forward of a rear vehicle seat 82. The non-inflatable portion 70 is positioned adjacent the vehicle side structure 16 in a position generally overlying the vehicle B-pillar 32 and extends substantially from the upper edge 50 to the lower edge 52 of the inflatable curtain 14. In the illustrated embodiment, the non-inflatable portion 70 helps define inflatable front and rear chambers 74 and 76, respectively, of the inflatable curtain 14. The non-inflatable portion 70 also helps define inflatable upper and lower passages 84 and 86, respectively, that provide fluid communication between the front and rear chambers 74 and 76.

The inflatable curtain may also include points of connection 90. The points of connection 90 comprise non-inflatable portions of the inflatable curtain 14 in which the first and second panels 40 and 42 are interconnected. In the illustrated embodiment, the inflatable curtain 14 includes two points of connection 90 located in the front chamber 74 of the curtain and two points of connection 90 located in the rear chamber 76 of the curtain. It will be appreciated by those skilled in the art that the points of connection may have a desired shape that is different from those of the illustrated embodiment. The points of connection 90 may help to limit the inflated thickness of the front and rear chambers 74 and 76 of the inflatable curtain 14.

The vehicle 12 includes a sensor mechanism 92 (shown schematically in FIGS. 1 and 2) for sensing a side impact to the vehicle 12 and/or a rollover of the vehicle 12. The sensor mechanism 92 actuates the inflator 24 in response to the sensing of a side impact or a vehicle rollover. In the event of a rollover of the vehicle or a side impact to the vehicle 12 for which inflation of the inflatable curtain 14 is desirable, the sensor mechanism 92 provides an electrical signal over lead wires 94 to the inflator 24. The electrical signal causes the inflator 24 to be actuated in a known manner. The inflator 24 discharges fluid under pressure through fill tube 22, which directs the fluid into the inflatable curtain 14.

The inflatable curtain 14 inflates under the pressure of the inflation fluid from the inflator 24. The inflatable curtain 14 inflates away from the roof 18 in a downward direction as shown in the drawings and in a downward direction with respect to the direction of forward travel of the vehicle 12 into the position illustrated in FIGS. 2 and 3.

The inflatable curtain 14, when inflated, extends along the side structure 16 of the vehicle 12 and is positioned between the side structure and any occupant of the vehicle. When the inflatable curtain 14 is in the inflated condition, the first panel 40 is positioned adjacent the side structure 16 of the vehicle 12. The upper edge 50 is positioned adjacent to the intersection of the roof 18 and the side structure 16 of the vehicle 12. The front portion 54 (FIG. 2) is positioned adjacent to the A pillar 30 of the vehicle 12. The rear portion 56 of the inflatable curtain 14 is positioned adjacent to the C pillar 34 of the vehicle 12. The inflatable curtain 14 extends between the A pillar 30 and the C pillar 34 of the vehicle 12 and overlies at least a portion of the A pillar, C pillar, and the B pillar 32 of the vehicle.

Those skilled in the art will appreciate that the inflatable curtain 14 may have alternative configurations. For example, in the illustrated embodiment, the inflatable curtain 14 extends between the A pillar 30 and the C pillar 34 of the vehicle 12. The inflatable curtain 14 could, however, extend between the A pillar 30 and the B pillar 32 only or between the B pillar and the C pillar 34 only. Also, in a vehicle having A, B, C, and D pillars (not shown), the inflatable curtain 14 could, when inflated, extend between the A pillar and the D pillar.

The inflatable curtain 14, when inflated, helps to protect a vehicle occupant in the event of a vehicle rollover or a side impact to the vehicle 12. The inflatable curtain 14, when inflated, helps to absorb the energy of impacts with the curtain and helps to distribute the impact energy over a large area of the curtain.

Those skilled in the art will recognize that the first and second panels 40 and 42 of the inflatable curtain 14 will experience stress when the curtain is inflated. Such stress is caused at least partially by the inflation fluid pressure in the inflated curtain 14. Non-inflatable portions of the inflatable curtain 14 will thus experience a relatively low amount of stress when the curtain is inflated. The amount of stress experienced by inflatable portions of the inflatable curtain 14 depends upon the amount of surface area of the first and second panels 40 and 42 acted on by the inflation fluid pressure. In general, an inflatable portion of the inflatable curtain 14 having a larger surface area acted on by the inflation fluid pressure will experience relatively high amounts of stress, whereas an inflatable portion of the curtain having a smaller surface area acted on by the inflation fluid pressure will experience relatively low amounts of stress.

According to the present invention, the inflatable curtain 14 is formed by weaving the first and second panels 40 and 42 simultaneously. The first and second panels 40 and 42 are interwoven to form the perimeter connection 46, the non-inflatable portion 70, and the points of connection 90. The inflatable curtain 14 thus has a woven one piece construction. This can be accomplished by weaving the inflatable curtain 14 using a known process, such as Jacquard weaving.

Figure 4:
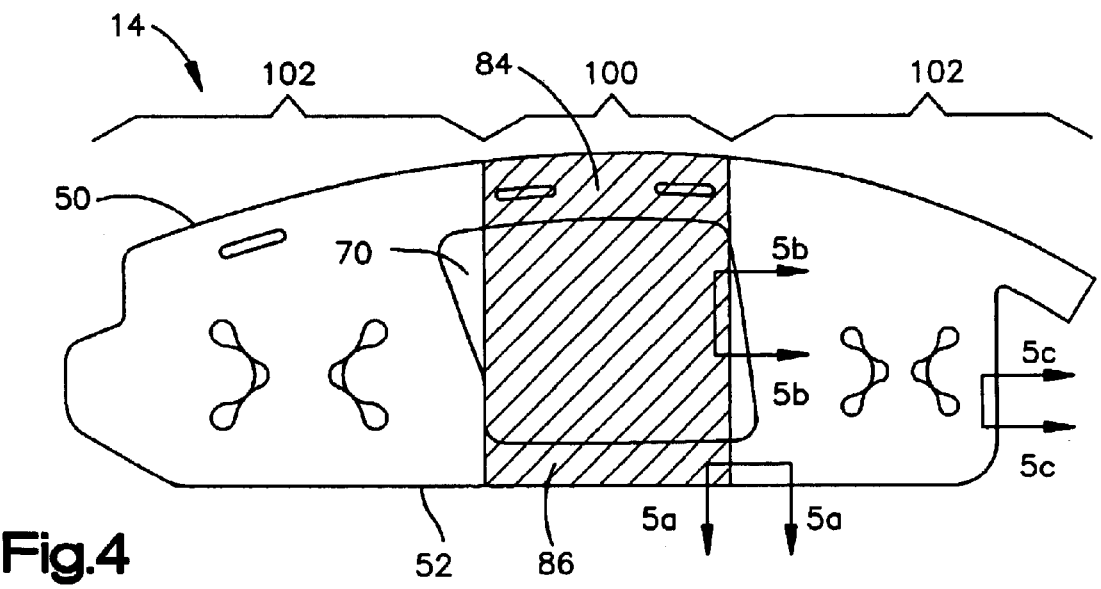
FIG. 4 is a plan view of a portion of the apparatus of FIG. 2.

Referring to FIG. 4, as a feature of the present invention, the inflatable curtain 14 has a portion 100 that has a weave density lower than the weave density of the remainder of the inflatable curtain. The portion 100 is indicated generally by the cross-hatched portion of the inflatable curtain 14. The portion 100 extends from the upper edge 50 to the lower edge 52 of the inflatable curtain 14 along a portion of the length of the curtain. As shown in FIG. 4, the portion 100 is occupied largely by the portions of the inflatable curtain 14 subject to relatively lower stresses than the remainder of the curtain, i.e., the non-inflatable portion 70 and the upper and lower passages 84 and 86.

As stated above, the non-inflatable portion 70 may have an alternative configuration including a plurality of parallel inflatable and non-inflatable portions of the curtain. In this instance, the inflatable curtain 14 would still be subject to relatively low stresses in this area because the inflatable portions would have relatively small surface areas and the non-inflatable portions would also be subjected to relatively low stress. Therefore, it will be appreciated that the portion 100 of the inflatable curtain 14 may comprise an inflatable portion of the curtain subject to relatively low stress, a non-inflatable portion of the curtain subject to relatively low stress, or any combination of inflatable and non-inflatable portions of the curtain that are subject to relatively low stress.

The woven fabric of the inflatable curtain 14, i.e., the first and second panels 40 and 42, is constructed of a plurality of warp threads and weft threads (also known as fill). The warp threads are arranged parallel to each other and the weft threads are interlaced between the warp threads in a direction generally perpendicular to the warp threads. The density of the warp threads is determined by the number of warp threads included per unit length of woven fabric. This is typically expressed as the number of ends per unit length (e.g., ends/cm). The density of the weft threads is determined by the number of weft threads included per unit length of woven fabric. This is typically expressed as the number of picks per unit length (e.g., picks/cm). The weave density of the inflatable curtain 14 is determined by the weave density of both the warp and the weft threads in the woven curtain fabric. Therefore, the weave density of the portion 100 may be reduced by reducing the weave density of the warp and/or weft threads.

Those skilled in the art will appreciate that, in modern programmable looms, it may be much easier to vary the weave density of the weft threads than it is to vary the weave density of the warp threads. This is because a change in the density of the warp threads would require a hardware setup (e.g. harness, warp beam, reed, etc.) unique to the weave density pattern, whereas a change in the density of the weft threads requires only altering the programming of the loom. Therefore, according to a preferred embodiment of the present invention, the material construction of the portion 100 is reduced by varying the weave density of the weft threads. The varied weave density of the inflatable curtain 14 is illustrated in FIGS. 5a–5c.

Figure 5A:
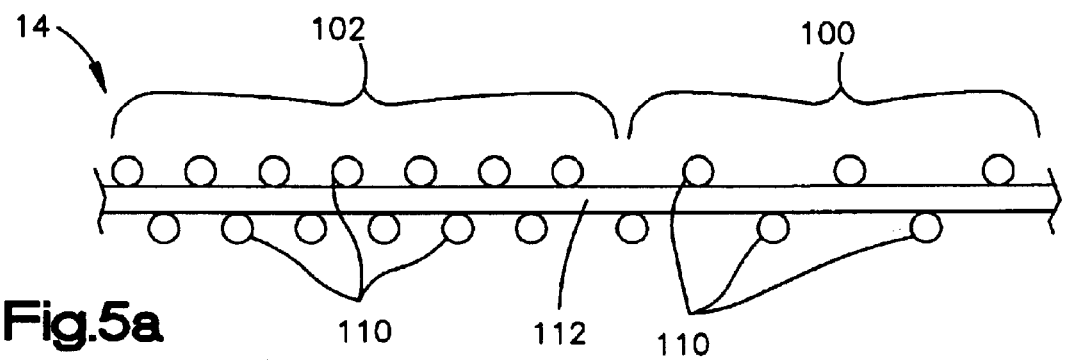
FIGS. 5a–5c are magnified sectional views illustrating the construction of portions of the apparatus of FIG. 4.
Figure 5B:
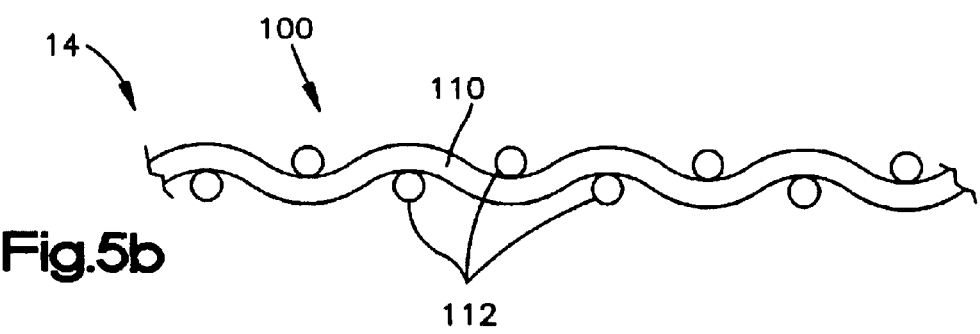
Figure 5C:
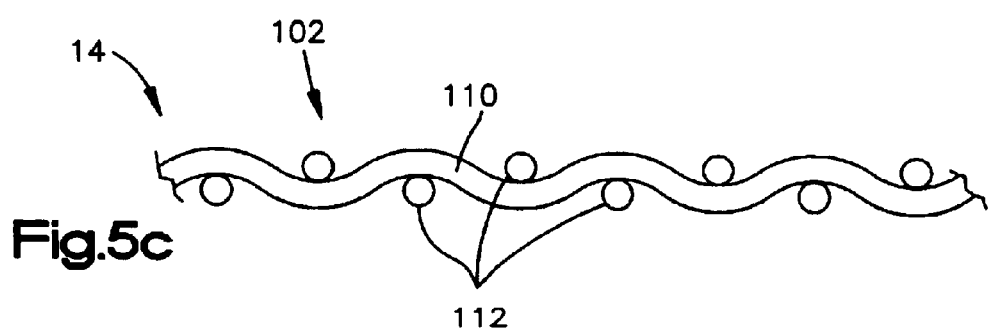

As illustrated in FIG. 5a, the weft threads 110 of the portion 100 have a lower weave density (ends/unit length) than the weft threads of the remaining portions 102 of the inflatable curtain 14. The weft thread 110 is interlaced between the warp threads 112 of the portion 100 and the remaining portions 102. As illustrated in FIGS. 5b and 5c, the weave density of the warp threads 112 is the same in both the portion 100 (FIG. 5b) and the remaining portions 102 (FIG. 5c) of the inflatable curtain 14.

Figure 6:
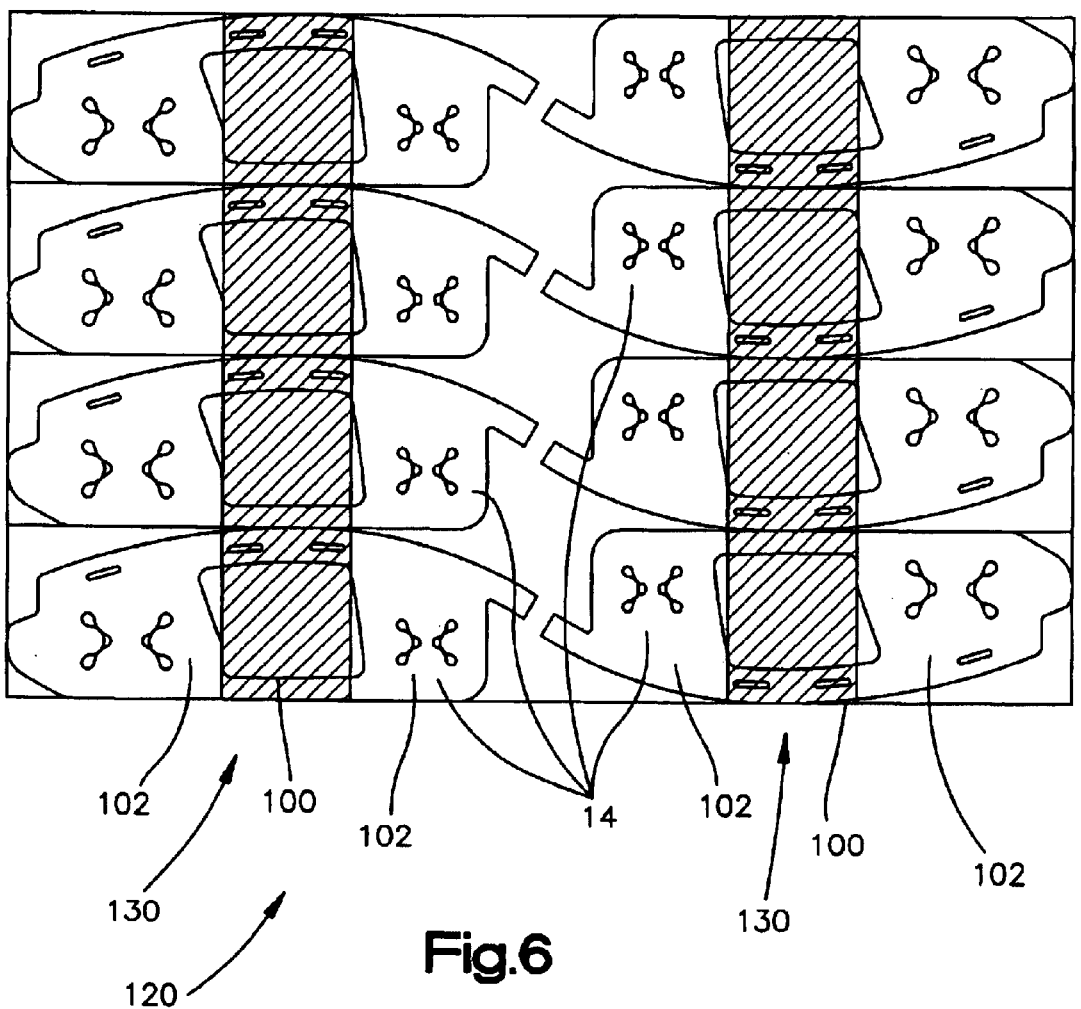
FIG. 6 is a plan view of a woven sheet including a plurality of apparatuses for helping to protect a vehicle occupant constructed in accordance with the illustrated embodiment of the present invention.

According to a preferred embodiment of the present invention, the inflatable curtain 14 is produced by weaving a plurality of curtains simultaneously in a sheet. This is illustrated in FIG. 6. Once the sheet 120 is produced, the individual inflatable curtains 14 are then cut out to separate the curtains. The sheet 120 illustrated in FIG. 6 includes eight individual inflatable curtains 14. The inflatable curtains 14 are woven in rows, indicated at 130, each including four curtains. The portions 100 of each inflatable curtain 14 in the rows 130 are aligned with each other. In the embodiment illustrated in FIG. 6, the sheet 120 includes two rows 130 of inflatable curtains 14. It will be appreciated that the curtains 14 could be woven in continuous sheet 120 including any desired number of rows 130.

The reduced weave density of the portion 100 helps to reduce the overall cost involved in manufacturing the inflatable curtain 14. Cost reductions are realized in a reduction in raw materials as well as a reduction in production time. For example, a known inflatable curtain 14 may be constructed with 350 dtex nylon yarn, requiring 23.5 ends/cm (warp) and 23.5 picks/cm (weft) per fabric layer. In accordance with the reduced construction inflatable curtain 14 of the present invention, the weave density of the portion 100 may be reduced by requiring 23.5 ends/cm and only 18.5 picks/cm per fabric layer. The effects of the reduced weave density of the portion 100 are illustrated in the following table:

TABLE 1

| Parameter | Units | Prior Art Curtain | Present Invention | Delta |
| --- | --- | --- | --- | --- |
| Yarn | Dtex | 350 | 350 | |
| Construction of Normal Density Portion (Fill) | Picks/meter | 2350 | 2350 | |
| Construction of Low Density Portion (Fill) | Picks/meter | 2350 | 1850 | |
| Curtain Length | Meters | 1.5 | 1.5 | |
| Length of Low Density Portion | Meters | 0.37 | 0.37 | |
| Average Construction (Fill) | Picks/meter | 2350 | 2227 | |
| Fabric Width | Meters | 2.0 | 2.0 | |
| Curtains/Width (Row) | N/A | 4 | 4 | |
| Machine Speed | Picks/minute | 480 | 480 | |
| Yarn Length per Row (Four Curtains) | Meters | 7050 | 6681 | 5.2% |
| Production Rate | Bags/hour | 32.70 | 34.48 | 5.4% |
| Fabric Weight | G/sq m | 185 | 175 | 5.2% |

Table 1 illustrates the manufacture of a single row 130 of four inflatable curtains 14 of the sheet 120 of FIG. 6. Viewing FIG. 6 in conjunction with Table 1, in production, the sheet 120 has a width of about 2.0 meters, which supports weaving four inflatable curtains 14 simultaneously across the width. The warp direction is in the direction of the length of the inflatable curtains 14. The weft (fill) direction is in the direction of the width of the sheet 120, i.e., perpendicular to the length of the inflatable curtains 14. The portion 100 may comprise at least 20–25% of the entire surface area of the inflatable curtain 14. In the embodiment illustrated in FIG. 6, each of the inflatable curtains has a length of about 1.5 meters, of which about 0.37 meters is occupied by the portion 100. The portion 100 thus comprises about 25% of the material woven in the sheet 120 in order to produce the four inflatable curtains 14.

As shown in Table 1, the portion 100 is constructed with 1850 picks/meter, whereas the remaining portions 102 are constructed with 2350 picks/meter. Weaving the four inflatable curtains 14 across the length of the sheet 120 of the illustrated embodiment thus requires an average of 2227 picks/meter (length), as opposed to 2350 picks/meter for a curtain with a constant weave density. Since the inflatable curtains 14 are each 1.5 meters long, the yarn length required to produce a row 130 (four curtains) is easily determined. As illustrated in Table 1, the reduced weave density construction of the present invention results in a 5.2% reduction in yarn length per row 130. This also results in a 5.2% reduction in fabric weight of the row 130. Given that a known commercial loom has a machine speed of 480 picks/minute, the number of inflatable curtains 14 that can be produced in a given amount of time can be easily determined. As illustrated in Table 1, the production rate of the inflatable curtains 14 is improved by a factor of 5.4% when the curtains are constructed in accordance with the present invention.

From the above description of the invention, those skilled in the art will perceive improvements, changes and modifications. For example, in the illustrated embodiment, the inflatable curtain 14 was constructed using a 350 dtex nylon yarn. Those skilled in the art will appreciate that a heavier yarn, such as 470 dtex nylon yarn could also be used to construct the curtain. In this instance, the weave density in the pick direction and the fill direction of both the portion 100 and the remaining portion 102 could be decreased. Such improvements, changes and modifications within the skill of the art are intended to be covered by the appended claims.

Having described the invention, the following is claimed:

1. Apparatus for helping to protect an occupant of a vehicle, said apparatus comprising:

an inflatable vehicle occupant protection device that is inflatable into a position between a part of the vehicle and a vehicle occupant, said inflatable vehicle occupant protection device comprising overlying panels that are secured together, said inflatable vehicle occupant protection device having an interwoven seam extending around a periphery of said inflatable vehicle occupant protection device to define an inflatable portion and at least one non-inflatable portion, said non-inflatable portion comprising a portion of said overlying panels interwoven with each other within said seam periphery; and an inflation fluid source that provides inflation fluid for inflating said inflatable vehicle occupant protection device, said panels including first overlying portions subject to relatively low stress extending across said inflatable vehicle occupant protection device when said inflatable vehicle occupant protection device is inflated, said panels further including second overlying portions extending across said inflatable vehicle occupant protection device subject to relatively high stress when said inflatable vehicle occupant protection device is inflated, said first portions having a woven construction of a first weave density, said second portions having a woven construction of a second weave density, greater than said first weave density.

2. Apparatus as recited in claim 1, wherein said inflatable vehicle occupant protection device comprises a single piece of woven material.

3. Apparatus as recited in claim 1, wherein said first portion includes said non-inflatable portion of said inflatable vehicle occupant protection device.

4. Apparatus as recited in claim 1, wherein said first and second portions of said inflatable vehicle occupant protection device have generally equal fill densities, said first portion having a first warp density, said second portion having a second warp density, said second warp density being greater than said first warp density.

5. Apparatus as recited in claim 1, wherein said inflatable vehicle occupant protection device is inflatable away from a vehicle roof into a position between a side structure of the vehicle and a vehicle occupant, said inflatable vehicle occupant protection device having a length and upper and lower edges extending along said length, said first portions extending from adjacent said upper edge to adjacent said lower edge along a portion of said length of said inflatable vehicle occupant protection device, said second portions comprising the remainder of said inflatable vehicle occupant protection device.

6. Apparatus as recited in claim 5, wherein said inflatable vehicle occupant protection device is woven having a warp direction extending generally along the length of said inflatable vehicle occupant protection device, said inflatable vehicle occupant protection device having a fill direction extending perpendicular to said warp direction.

7. Apparatus as recited in claim 5, further comprising a fill tube for directing said inflation fluid into said inflatable vehicle occupant protection device to inflate said inflatable vehicle occupant protection device.

8. Apparatus as recited in claim 7, further comprising a housing for storing said inflatable vehicle occupant protection device in a stored position, said inflatable vehicle occupant protection device, said fill tube and said housing have generally elongated configurations extending along the side structure of the vehicle near the intersection of the side structure and the vehicle roof when said inflatable vehicle occupant protection device is in said stored position.

9. Apparatus as defined in claim 5, wherein said inflatable vehicle occupant protection device comprises a single piece of woven material.

10. Apparatus as recited in claim 5, wherein said inflatable vehicle occupant protection device comprises an inflatable curtain.

11. Apparatus for helping to protect an occupant of a vehicle that has a side structure including front and rear side windows and a roof, said apparatus comprising:

an inflatable vehicle occupant protection device that is inflatable away from the vehicle roof into a position between the front and rear windows of the vehicle and a vehicle occupant, said inflatable vehicle occupant protection device having a length and upper and lower edges extending along said length; and an inflation fluid source that provides inflation fluid for inflating said inflatable vehicle occupant protection device, said inflatable vehicle occupant protection device including a first portion extending from adjacent said upper edge to adjacent said lower edge along a portion of said length of said inflatable vehicle occupant protection device, said inflatable vehicle occupant protection device including a second portion comprising the remainder of said inflatable vehicle occupant protection device, said first portion having a woven construction of a first weave density, said second portion having a woven construction of a second weave density greater than said first weave density.

12. Apparatus for helping to protect an occupant of a vehicle, said apparatus comprising:

an inflatable vehicle occupant protection device that is inflatable into a position between a part of the vehicle and a vehicle occupant, said inflatable vehicle occupant protection device comprising overlying panels interwoven along at least a portion of a perimeter of said inflatable vehicle occupant protection device, said inflatable vehicle occupant protection device having a length and upper and lower edges extending along said length; and an inflation fluid source that provides inflation fluid for inflating said inflatable vehicle occupant protection device, said inflatable vehicle occupant protection device including a non-inflatable portion extending substantially from said upper edge to said lower edge along a portion of said length of said inflatable vehicle occupant protection device, said non-inflatable portion having a woven construction of a first weave density, a remainder of said inflatable vehicle occupant protection device having a woven construction of a second weave density greater than said first weave density.

13. Apparatus for helping to protect an occupant of a vehicle that has a side structure including front and rear side windows and a roof, said apparatus comprising:

an inflatable vehicle occupant protection device that is inflatable away from the vehicle roof into a position between the front and rear side windows of the vehicle and a vehicle occupant, said inflatable vehicle occupant protection device having a length and upper and lower edges extending along said length; and an inflation fluid source that provides inflation fluid for inflating said inflatable vehicle occupant protection device, said inflatable vehicle occupant protection device including a non-inflatable portion extending substantially from said upper edge to said lower edge along a portion of said length of said inflatable vehicle occupant protection device, said non-inflatable portion having a woven construction of a first weave density, a remainder of said inflatable vehicle occupant protection device having a woven construction of a second weave density greater than said first weave density.

14. Apparatus for helping to protect an occupant of a vehicle that has a side structure and a roof, said apparatus comprising an inflatable vehicle occupant protection device that is inflatable away from the vehicle roof into a position between the side structure of the vehicle and a vehicle occupant, said inflatable vehicle occupant protection device being woven as a single piece of material, said inflatable vehicle occupant protection device including a non-inflatable portion having a woven construction of a first weave density, a remainder of said inflatable vehicle occupant protection device having a woven construction of a second weave density greater than said first weave density.

* * * * *